United States Patent [19]

Codino

[11] E Patent Number: Re. 33,433

[45] Reissued Date of Patent: Nov. 13, 1990

[54] LASAGNA PRODUCT

[76] Inventor: Leno Codino, 8 Rivercrest Dr., Rexford, N.Y. 12148

[21] Appl. No.: 202,211

[22] Filed: Jun. 3, 1988

Related U.S. Patent Documents

Reissue of:

[64] Patent No.: 4,711,165
Issued: Dec. 8, 1987
Appl. No.: 51,250
Filed: May 13, 1987

U.S. Applications:

[63] Continuation of Ser. No. 788,083, Oct. 17, 1985, abandoned, which is a continuation-in-part of Ser. No. 683,356, Dec. 19, 1984, Pat. No. 4,569,849.

[51] Int. Cl.[5] ..... A23L 1/16; A23P 1/00

[52] U.S. Cl. ..... 99/353; 99/355; 99/450.6; 99/450.7

[58] Field of Search ..... 99/352, 353, 355, 450.6, 99/450.7; 426/144, 275, 283, 496, 502, 516, 517

[56] References Cited

U.S. PATENT DOCUMENTS

| | | | |
|---|---|---|---|
| 1,844,142 | 2/1932 | Barili | 99/450.7 |
| 2,686,720 | 8/1954 | Rosa | 426/144 |
| 3,468,675 | 9/1969 | Potzl | 426/517 |
| 3,532,510 | 10/1970 | Zimmerman | 99/450.6 X |
| 3,605,641 | 7/1969 | Shuster | 99/450.7 |
| 3,611,950 | 10/1971 | Battaglia | 99/450.6 X |
| 3,669,007 | 6/1972 | Pulici | 99/450.6 |
| 3,757,676 | 9/1973 | Pomara | 99/450.6 |
| 3,798,343 | 3/1974 | Vitale | 426/502 |
| 4,275,647 | 6/1981 | Chambers | 426/283 |
| 4,416,910 | 11/1983 | Hayashi et al. | 426/283 |
| 4,418,085 | 11/1983 | Becquelet | 426/502 |

*Primary Examiner*—Timothy F. Simone
*Attorney, Agent, or Firm*—Schmeiser, Morelle & Watts

[57] ABSTRACT

In a machine for preparing precooked lasagna. A mixer for combining ingredients necessary for the preparation of pasta and an extruder for forming at least two uncooked strips of pasta. After passing the strips through the cooker, they are deposited into a cooling tank where they are allowed to accumulate. A separator and guide means aligns the noodles on top of one another as they pass out of the cooling tank. The noodles are then passed above and below the nozzle where a filler material is deposited between the strips. The strips are then cut for packaging.

An improved lasagna product wherein the edges are scalloped and a noodle is corrugated for improved sauce migration.

15 Claims, 5 Drawing Sheets

FIG. 6
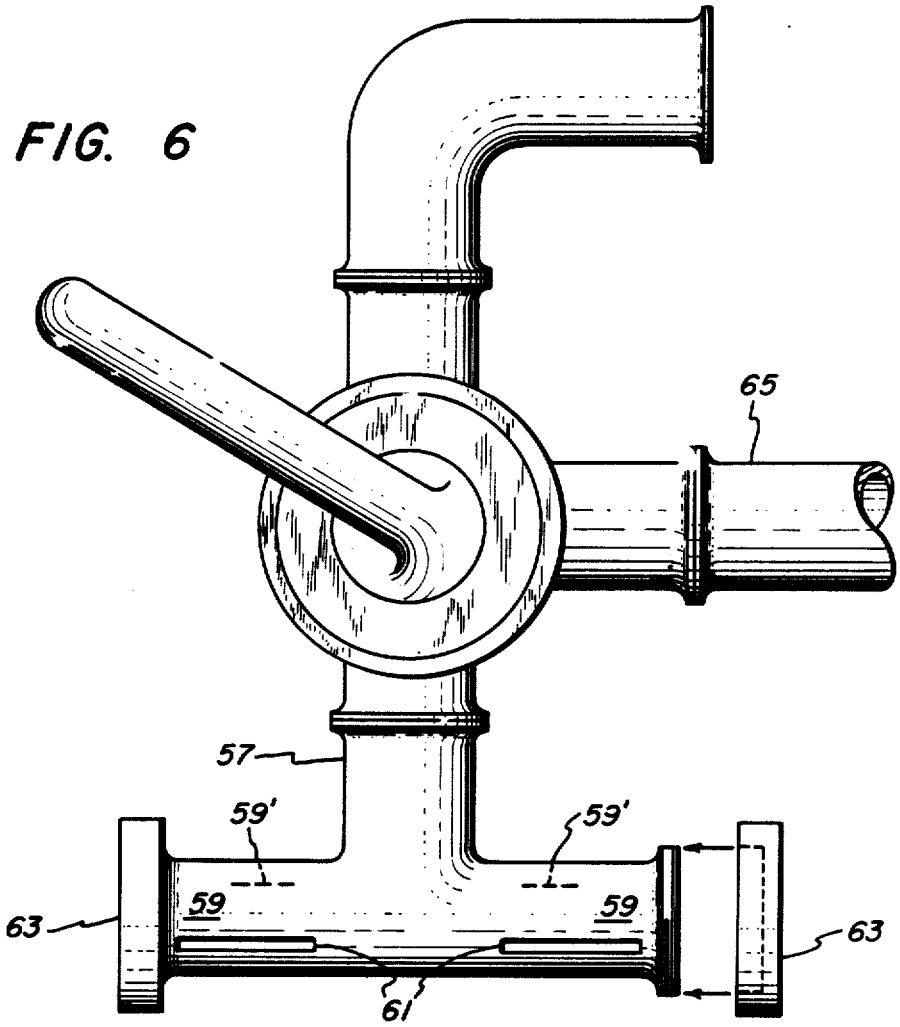
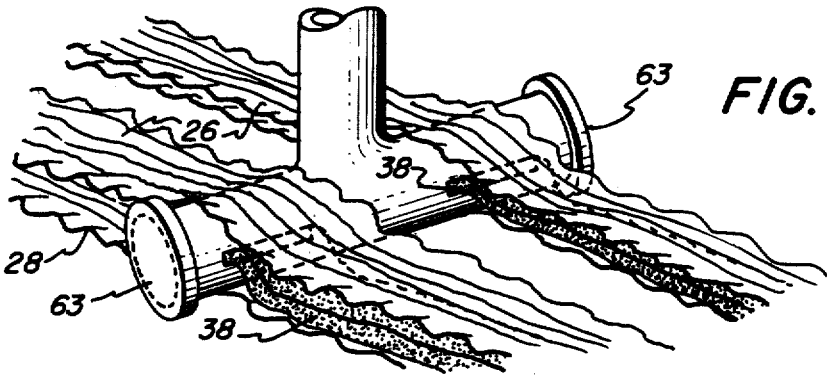
FIG. 7

LASAGNA PRODUCT

Matter enclosed in heavy brackets [ ] appears in the original patent but forms no part of this reissue specification; matter printed in italics indicates the additions made by reissue.

This application is a *reissue of Ser. No. 07/051,250, filed May 13, 1987, now U.S. Pat. No. 4,711,165 which is a* continuation of application Ser. No. 788,083, filed Oct. 17, 1985, abandoned, which application was a continuation in part of prior application Ser. No. 683,356 filed on Dec. 19, 1984, U.S. Pat. No. 4,569,849.

FIELD OF THE INVENTION

Generally, this invention relates to a machine and process for producing a new precooked lasagna product. More specifically, this is a continuous asynchronous process for creating a lasagna product wherein the noodles are corrugated and have scalloped edges.

BACKGROUND AND SUMMARY OF THE INVENTION

The production of flour based products has served as a staple food source from times too early to determine. Somewhat similarly, the automated production of pasta products has also received a great deal of attention over an extended number of years. These devices have covered a variety of applications from the production of precooked stuffed pasta products such as manicotti and ravioli.

While the production of products such as these has received significant amount of attention during the years, the production of the product known as lasagna appears to have received much less consideration. Thus, while broad lasagna type noodles are produced in large quantities, the responsibility falls upon the purchaser to cook the noodles and layer them with other substances such as meat, cheese and sauce in order to produce the finished product which is then baked. With the demands of today's society, and the general appeal that lasagna has to the public, there is little doubt that an easy to prepare yet quality lasagna product is desirable.

When considering the state of the art, several reasons for the failure to economically product such a product are suggested. Since the lasagna product is not enclosed as other pasta type products, it is necessary to work with separate continuous strips of pasta noodles. In order to provide a filling between these separate noodle strips, various alignment steps must be performed. To do this economically, it is preferable to deal with the separate strips as a single unit and avoid the use of separate hoppers and extruders as has been done in the past. The difficulty becomes more evident when as in the present invention, one wishes to provide a precooked product. Since it is not desirable to cook the product after the filling has been introduced and since most prior art devices that deal with more than one strip use separate hoppers for each strip, it would be necessary to join the strips for cooking, or use separate cooking means, then separate strips for filling and rejoin them. In addition to the difficulties encountered in aligning separate noodle strips, as the process is extended to include steps such as extruding, cooking filling and cutting, breakage of the strips becomes a difficulty. Should one seek to overcome this difficulty by providing slack into the noodle strips for an asynchronous process, greater difficulties in alignment are encountered.

I also found that when providing a precooked, ready to bake lasagna product, other difficulties are encountered in the production of a product satisfactory to the ultimate consumer. The individual who makes his own lasagna product has little or no difficulty distributing the filling substances such as meat, cheese, and sauce evenly upon the layers of noodle. However, when the product is precooked and purchased frozen, there is little or no opportunity to evenly distribute the ingredients without trying to separate the product into its components. Thus, whereas other manufacturers of noodle strips seek to inhibit the flow of sauce, since the preparer is applying the sauce where he desires it to be, the noodle strip configuration that assists and enhances the flow of sauce without the ultimate consumer having to separate the product. In addition, the filling between the noodle strips must be consistent and even throughout the product.

With these ideas in mind, I began working on my invention. The approach which led me to the development of my present invention was the realization that the use of slack in the noodle strips for the asynchronous production of the product would aid in the simultaneous production of the strips and help avoid breakage if the strips could be properly aligned prior to filling.

It was, therefore, an object of this invention to provide a machine for the continuous asynchronous production of a precooked lasagna product.

Another object of this invention was to provide such a machine which would limit breakage of the noodles and thus avoid the need to interrupt the process.

Another object of this invention was to provide a machine which would produce a precooked lasagna product wherein the inner filling was continuous and evenly distributed.

Another object of this invention was to provide a precooked lasagna product which enhanced sauce migration and flow.

Other objects of this invention will become apparent to those familiar with this field as the detailed description is considered.

*BRIEF DESCRIPTION OF THE DRAWINGS*

FIG. 6 is a front view of the filler (extruder) nozzle for multiple noodle trains.

FIG. 7 is a perspective, functioning view of filler (extruder) nozzle.

DETAILED DESCRIPTION OF THE DRAWINGS

Figure 1:
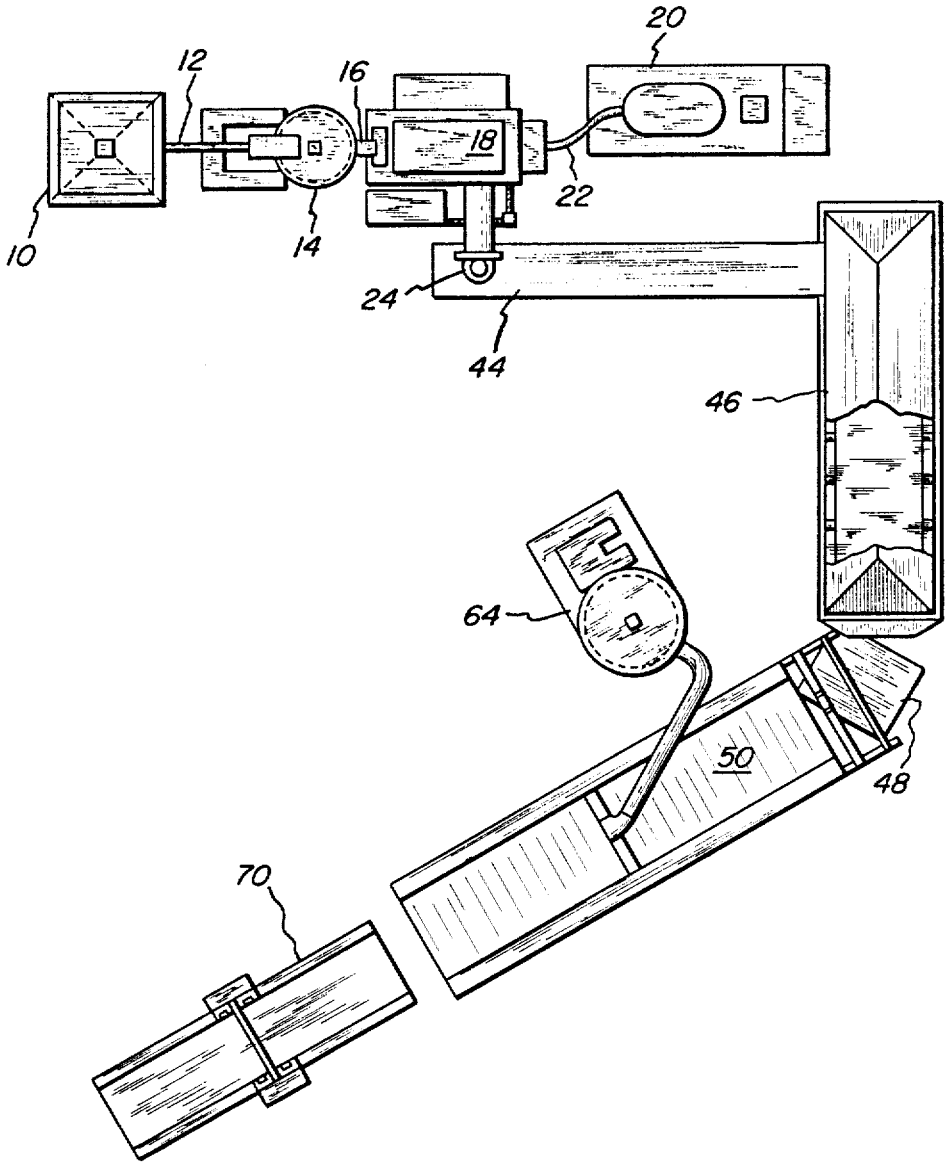
FIG. 1 is a top view of the production assembly.

FIG. 1 discloses a holding bin 10 which contains semolina or another flour type substance. The semolina is drawn through a tubing 12 into a measuring device 14.

This measuring device may be varied in order to adjust the amount of flour being delivered through pipe 16 into the mixer 18.

Simultaneously, a second holding bin 20 which is generally filled with eggs is delivering the egg product through a second pipe 22 into the mixer 18.

The delivery rates of the semolina and the egg are varied by means which are well known in the art in order to achieve the desired consistency.

Figures 2, 2A:
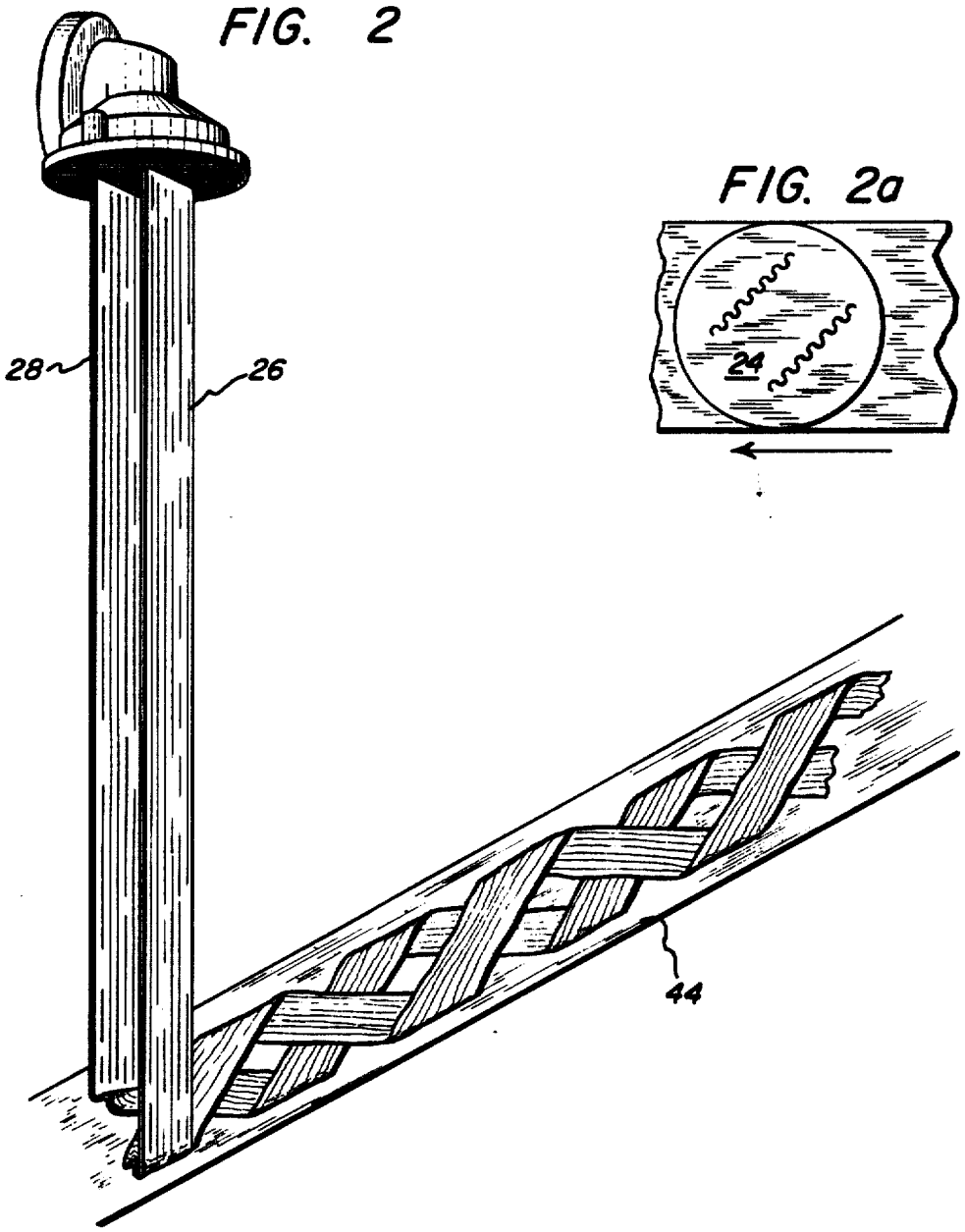
FIGS. 2 and 2a are elevational view of the extruder and one of the conveyor transfer mechanisms.

Once the desired consistency is achieved, the mixture is directed through an extruder 24 which is shown in greater detail in FIG. 2. The product being extruded is an uncooked continuous noodle strip.

As shown in FIG. 2a, the die of the extruder is fashioned so as to produce a first noodle strip 26 and second noodle strip 28. More particularly, the die is designed so as to form noodle strips having longitudinal corrugations 30 and scalloped edges, which for the purpose of this application will be used to mean a wavy or sinusoidal edge, having projections both above and below the longitudinal corrugations (see FIG. 4).

Figure 4:
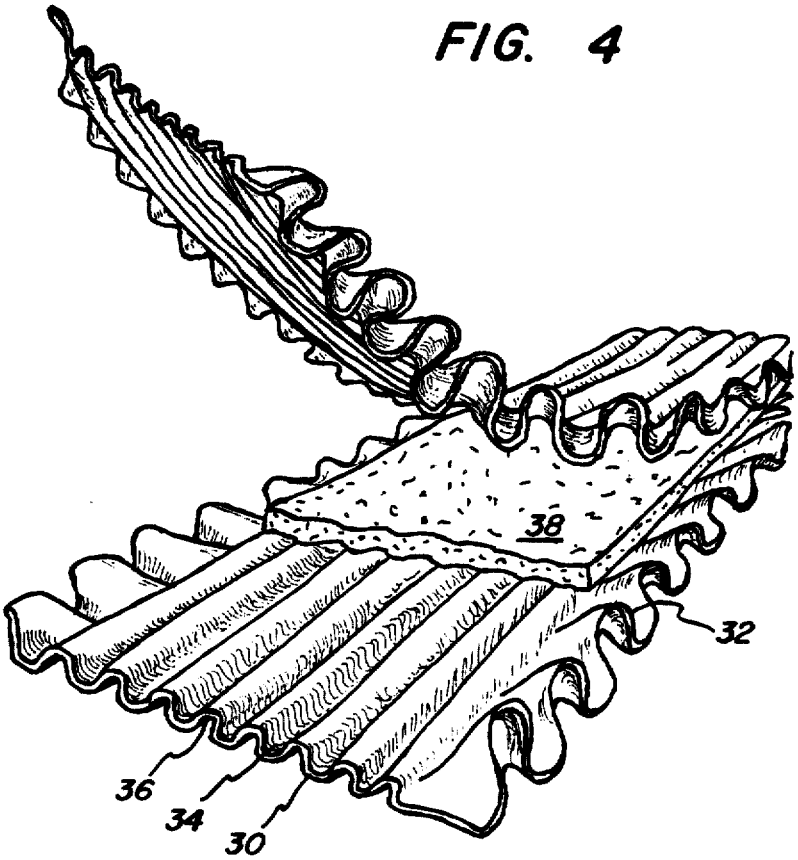
FIG. 4 is a perspective view of the product of this invention.

The longitudinal corrugations 30 form channels 34 and crests 36. The depth of the channels measured from the crests varies from 1/16 to ¼ of an inch. This depth enables most of the channels 34 to stay open even after a filler 38 is placed thereon. Thus, sauce migration along the noodle is aided despite the filler material. As also shown in FIG. 4, the scalloped edges 32 serve to direct the sauce applied along the edges of the noodle in toward the channels.

Figure 5:
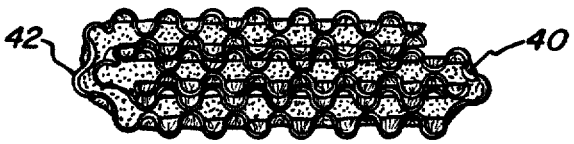
FIG. 5 is a side elevational view of the product of this invention.

FIG. 5 discloses the end product wherein the lasagna is folded in a "e" shape. In this configuration, the scalloped edges serve to hold the noodle strips apart from each other for better sauce migration. The resiliency of the noodles at turns 40 and 42 also aid to hold the strips apart from each other. Thus, when the product is packaged and frozen in this manner, the ultimate user can take the frozen precooked lasagna and simply pour sauce over it and still get sufficient migration of the sauce to have the sauce channel throughout a substantial amount of the product.

As shown in FIG. 2, the noodles are extruded onto a first conveyor belt 44. This first conveyor 44 transports the two continuous noodle strips to a cooker 46. As known by those familiar with the art, the cooker 46 also has a conveyor belt which carries the noodles through the cooker at a predetermined rate in order to assure complete cooking of the noodles. After exiting the cooker, the noodles are deposited into a cooling tank 48. In my preferred embodiment, the cooling tank is simply filled with water and is of a sufficient size to hold a large amount of noodles. By having a large amount of noodles within the cooling tank, not only is the cooling and congealing process better established, but the system becomes asynchronous since there is a great deal of latitude in the amount of excess noodles that are stored within the tank. This excess of noodles in the tank also serves to allow the machinery to be articulated at this point which can save substantially in the amount of room required to perform this process.

Figure 3:
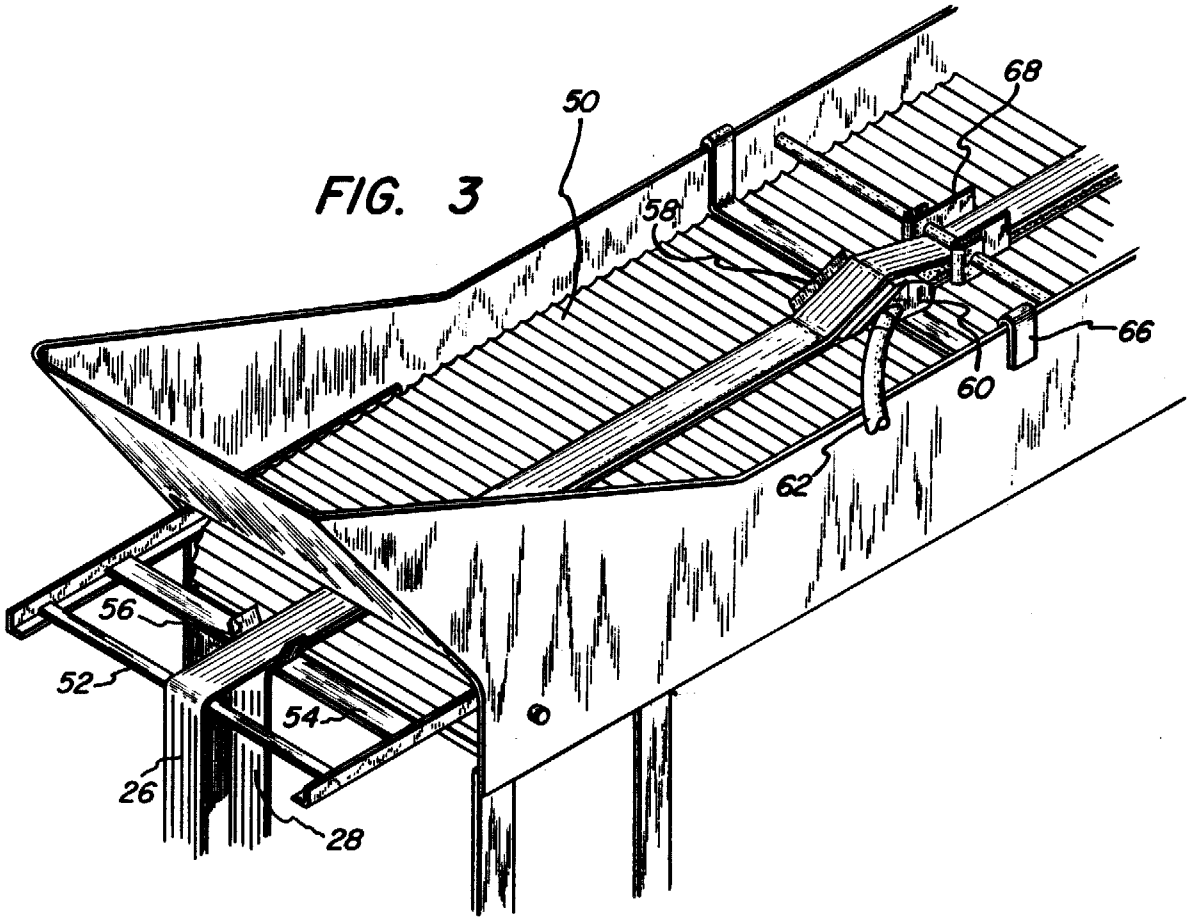
FIG. 3 is a perspective view of the noodle strips alignment and filling mechanism.

In initially setting up the process, the end of each noodle is directed out of the cooling tank and over a set of bars in the manner shown in FIG. 3.

As shown in FIG. 3, this set of bars extends outwardly from a second conveyor bolt 50 such that the bars are suspended over the cooling tank 48. The set of bars has a first bar 52 and a second bar 54 which are parallel to each other and are at least one foot above the cooling tank. In my preferred embodiment, these bars are actually 18 inches above the cooling tank. This allows the noodles to unwind as they are drawn out of the cooling tank and over the bars, thereby aligning the noodle strips axially in order to accomplish this, the strips must be separate. Therefore, the first noodle strip 26 passes over the first bar 52 and then proceeds over the second bar 54, whereas the second noodle strip rises out of the tank and only passes over the bar 54.

A guide 56 is attached to the second bar 54 and serves to align the first noodle strip 26 on top of the second noodle strip 28.

The noodle strips travel along the second conveyor belt 50 in this fashion until they come to an inclined separator 58 which is suspended a sufficient distance above the second conveyor belt 50 to allow the second noodle strip 28 to pass under the inclined separator while the first noodle strip 26 passes over the inclined separator. Immediately after the inclined separator and prior to the noodles' joining together, there is a nozzle 60 which is attached by means of a tube 62 to a hopper 64.

The hopper is filled with a predetermined filler such as cheese and serves to deposit a continuous strip of cheese onto the second noodle strip 28. The second noodle strip passes under the nozzle 60 which is suspended by means of a bracket 66 slightly above the second conveyor belt 50. After filling, the noodle strips pass through a second guide 68 which serves to assure alignment of the first noodle strip on top of the second noodle strip.

Another embodiment is envisioned which anticipates a side-by-side noodle train arrangement. The previously described apparatus is employed up until the separation of top noodle strip 26 from bottom noodle strip 28, preparatory to filling. The alternate embodiment dispenses with incline separator 58 and singular nozzle 60, as well as bracket 66 and second guide 68. In place of tube 62, there are; a pipe 65 running from the hopper 64, suspended a sufficient distance above the second conveyor belt 50 so as to allow the extensions 59 of T-fitting 57 to act as incline separators 59', and thus separate noodle strips 26 from noodle strips 28, which continue to lie on the second conveyor belt 50. Thereafter the separated noodle strips 26 are guided by the T-fitting 57 close-ended extension flanges 63 so as to remain superposed above the lower noodle strip 28. After passing the incline (T-fitting extension 59'), the filling 38 is injected or extruded onto the lower noodles 28 through apertures 61. Immediately thereafter, top noodles 26 decline off of the T-fitting extensions 59, 59' properly aligned by flanges 63, to rest on lower noodle strips 28.

The precooked lasagna product then passes to a cutter 70 where the noodles are cut into strips of predetermined length. In my preferred embodiment, the noodle is folded in a "e" shape as shown in FIG. 5. After folding, the noodle is packaged and frozen so that the ultimate consumer need only add sauce and bake the product.

In operation, the consistency of the semolina and egg mixture is set and the mixture is then passed through an extruder 24. The die assembly of the extruder is waved so as to produce noodle strips having longitudinal corrugations 30 and scalloped edges 32. A first conveyor belt 44 directs the first noodle strip 26 and the second noodle strip 28 to a cooker 46 wherein the cooker conveyor belt passes these strips through the cooker at a predetermined rate in order to properly cool the noodles. After passing through the cooker, the noodle strips are deposited into a cooling tank. When the process is being initially instituted, the individual running the process will allow a significant amount of noodles to accumulate in the tank. Generally, somewhere in the neighborhood of twenty feet of noodle strips is a sufficient amount to be deposited in the tank. The individual then takes one of the noodle strips, which for the sake of description will be called the second noodle strip and passes it up from the tank over a second bar 54 and onto a second conveyor belt 50. Almost simultaneously, the first noodle strip 26 is directed up from the cooling tank 48 and over both a first bar 52 and the second bar 54. The strips are aligned so as to pass through a guide 56 which is secured to the second bar 54 and assures that the first noodle strip is positioned on top of the second noodle strip. The first noodle strip is then directed above an inclined separator 58 while the second noodle strip passes below the separator. Similarly, the first noodle strip is passed over the nozzle 60 while the second noodle strip is passed under the nozzle. The pump, (not shown) from the hopper 64 then directs a filling substance such as cheese through tube 62 and out of nozzle 60. The cheese is deposited onto the second noodle strip after which the first strips descends over the nozzle 60, thereby creating a lasagna type sandwich. A second guide 68 assures that the first noodle strip 26 is aligned directly over the second noodle strip 28. The noodles with filler then move to a cutter where they are cut into predetermined lengths. These lengths can vary significantly, but generally, I found that lengths of 6 to 10 inches are preferable.

After cutting, the product is folded into an "e" shape and packaged and frozen. The shape of the broad, lasagna type noodles is important in assisting the ultimate consumer in preparing the lasagna. The scalloped edges of the noodles as well as the use of the "E" shape provides openings between the noodle strips that are in contact with each other. Also, because the noodle is longitudinally corrugated with channels from 1/16 to ¼ inch in depth, sauce applied over the frozen product will be directed into the channels and will generally spread out substantially evenly during baking. In addition, the choose filler will generally not fill the corrugations, and therefore, sauce applied to the product will migrate along the channels and below the cheese. As soon as the product is baked, it is ready to be consumed.

While the above describes the preferred embodiment of this invention, it should be appreciated that various changes can be made without departing from the scope of the invention which is intended to be limited only by the appended claims.

I claim:

1. A machine for the production of precooked lasagna comprising:

means for mixing flour and eggs to a predetermined consistency;

an extruder for receiving said flour and egg mixture and extruding at least two continuous strips of broad lasagna type noodles;

means for transporting the strips being extruded through a cooker;

a cooling tank in close proximity to the cooker for reception of the noodles as they exit from the cooker, said tank being of sufficient size to contain a predetermined amount of noodles so as to provide slack and prevent breaking of the noodle strips;

means for suspending the noodle strips above the tank as said strips are drawn from the tank thereby allowing said strips to unwind;

means for aligning one of the strips on top of the other;

means for filling the space between the noodle strips with a previously chose filler; and means for cutting the now precooked lasagna into pieces of predetermined size.

2. The invention of claim 1 wherein said suspending means also serves as means for separating the noodle strips.

3. The invention of claim 2 wherein the suspending and separation means also acts as a means for aligning the noodle strips in the same axial plane.

4. The invention of claim 3 wherein said separating and aligning means consists of two parallel bars separated a predetermined distance from each other and suspended above the tank, whereby one of the noodle strips is passed over both the first and second bar in the pair and the other noodle is passed over only the second bar.

5. The invention of claim 4 including a guide secured to the second bar through which both noodle strips are passed such that one noodle strip is aligned on top of the other noodle strip.

6. The invention of claim 5 wherein said parallel bars are suspended at least one foot over the tank.

7. The invention of claim 4 wherein said filling means further comprises a means for conveying the two strips from the tank and along a predetermined path;

a nozzle secured above said conveying means a sufficient distance to allow one of the noodle strips to pass beneath the nozzle; and inclined means for lifting the top noodle strip off of the lower strip and directing it over said nozzle.

8. The invention of claim 7 including means for realigning the noodle strips on top of one another after they have passed the nozzle and the predetermined substance has been inserted between the strips.

9. The invention of claim 7 wherein said inclined means comprises external curved surfaces of said nozzle.

10. The invention of claim 8 wherein said inclined means for realigning the noodle strips comprises flanges attached to said nozzle; whereby said noodles are guided superposed and realigned on top of one another.

*11. A machine for production of precooked lasagna comprising:*

*means for mixing flour and eggs to a predetermined consistency;*

*an extruder for receiving said flour and egg mixture and extruding at least two continuous strips of broad lasagna type noodles;*

*means for transporting the strips being extruded through a cooker;*

*a cooling tank in close proximity to the cooker for reception of the noodles as they exit from the cooker, said tank being of sufficient size to contain a predetermined amount of noodles so as to provide slack and prevent breaking of the noodle strips;*

*means for suspending the noodle strips above the tank as said strips are drawn from the tank thereby allowing said strips to unwind;*

*means for aligning the strips in registry with one another;*

*means for applying a filling on one of the noodle strips with a previously chosen filler;*

*means for aligning the other strip on top of the filling; and*

*means for cutting the now precooked lasagna into pieces of predetermined size.*

*12. The invention of claim 11 wherein said suspending means also serves as means for separating the noodle strips.*

*13. The invention of claim 12 wherein the suspending and separating means also acts as a means for aligning the noodles in registry with one another.*

*14. The invention of claim 13 wherein said separation and aligning means consists of two parallel bars separated a predetermined distance from each other and suspended above the tank whereby one of the noodle strips is passed over both the first and second bar in the pair and the other noodle is passed over only second bar.*

*15. The invention of claim 14 wherein said filling means further comprises a means for conveying the two strips from the tank and along a predetermined path;*

*a nozzle secured above said conveying means a sufficient distance to allow one of the noodle strips to pass beneath the nozzle; and*

*means for directing the other noodle strip on top of the strip that passed beneath the nozzle such that the noodle strips are aligned on top of one another after they have passed the nozzle and the predetermined substance has been inserted between the strips.*

* * * * *